April 5, 1949. R. F. KOHR 2,466,318
AUTOMATIC TRANSMISSION AND OVERDRIVE
Filed Aug. 22, 1945
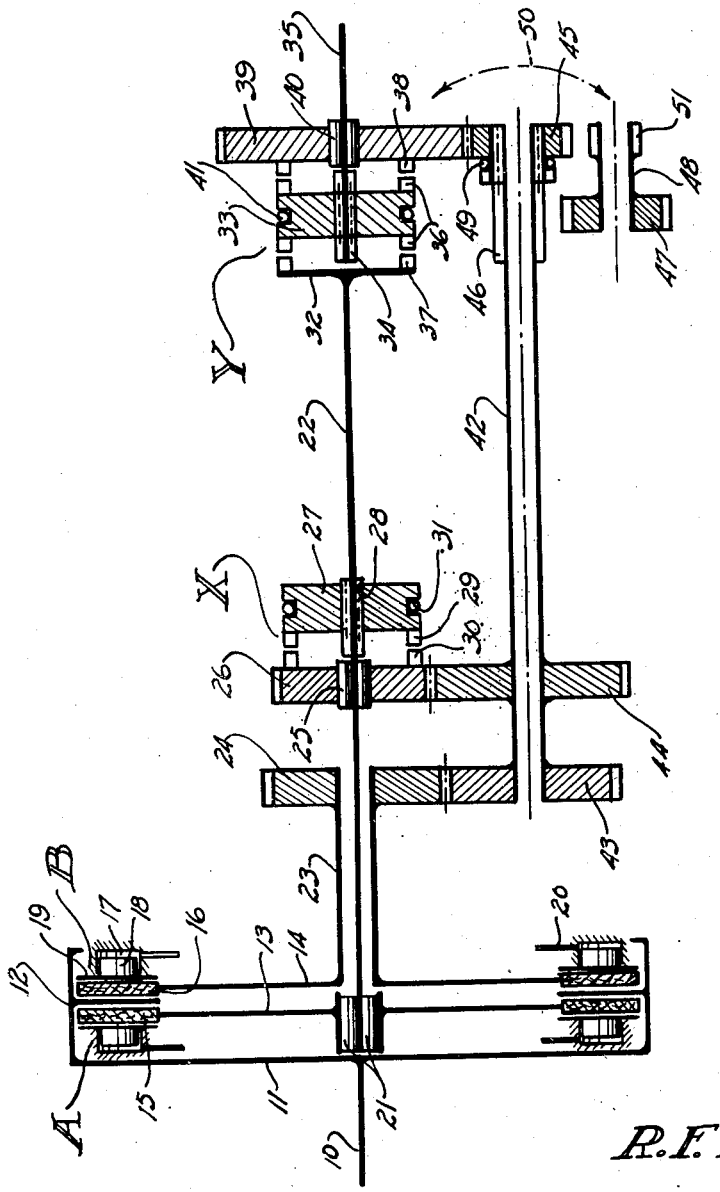
R. F. Kohr
INVENTOR.
BY Patented Apr. 5, 1949

2,466,318

UNITED STATES PATENT OFFICE 2,466,318

AUTOMATIC TRANSMISSION AND OVERDRIVE

Robert F. Kohr, Birmingham, Mich., assignor to Ford Motor Company, Dearborn, Mich., a corporation of Delaware Application August 22, 1945, Serial No. 611,976

11 Claims. (Cl. 74—330)

The present invention relates to an automatic variable speed transmission; and, more particularly, to a transmission mechanism or torque converter designed to vary the speed and torque ratios between the driving and driven members in a motor vehicle and characterized in having a series of individual clutches effecting the operation of the various ratios, one of these speed ratios being an overdrive.

The primary object of this invention is to devise an automatic mechanical transmission having an overdrive together with operating means responsive to the speed and torque changes for the several clutches without the necessity of timing devices limiting the successive clutch engagements to simultaneous operation.

Another object of the invention is to provide an overrunning or free-wheeling power train in the three normal forward speeds (which may be overruled in second speed when it is desired to brake the car against compression) together with a positively connected overdrive.

Another object of the invention is to provide a tranmission in which the power input is controlled through a plurality of friction clutches, and the engagement of the gear train is directly controlled by positive clutches, all of which may be hydraulically controlled with reference to both torque and speed requirements.

A further object of the invention is to provide a four-speed forward transmission in which the transition from one speed ratio to a successive speed ratio in either direction is controlled automatically and is effected through intermediate engaging means to obviate the timing of the interengaging elements so that simultaneous transitional declutching and clutching may occur simultaneously.

As a corollary of this, it is possible to employ the transmission without precise initial calibration of its controls and the components comprising it. For example, while successive clutches or brakes used in its production may be of identical design and construction, the internal frictional characteristics—to to cite but one consideration— may vary considerably from component to component. When reliance is placed upon simultaneous effective engagement, so that the various speed ratios may be engaged without perceptible shock, it has heretofore been necessary to match the components precisely to overcome this and other like variables. Much the same may be said for the remainder of the power train and it has always been very difficult in practice to obtain a precise matching of these components so that the clutch operations would be properly timed to give a smooth shift from one speed ratio to another. Apart from the difficulty encountered, such procedures inevitably add to the cost.

Another object of this invention is to devise a fully automatic transmission of the sliding gear type—clutch type which will be fully automatic in action so far as forward speeds are concerned, the only control required being that of selecting between the forward or reverse movement (or, should it prove desirable, to by-pass the freewheeling in second speed forward when driving in mountainous country) in which the positive clutches act concurrently with one or more friction clutches during all speed ratio transitions in either direction.

With these and other considerations in view, the invention consists of the structure described in the specification, claimed in the claims, and shown in the accompanying drawing in which the single figure represents a schematic diagram of a transmission constructed according to the invention employing the conventional symbols used to indicate the various parts thereof.

Referring to the drawing, 10 indicates an engine crankshaft terminating rearwardly in a flywheel 11 supporting a clutch housing 12 co-operating with the clutch discs 13 and 14 which, with their associated friction surfaces 15 and 16 go to make up friction clutches which will be referred to, for the sake of brevity, as A and B. These clutches are operated by hydraulic actuating means carried in the housing 12, which, for the purposes of this application, are indicated as the cylinders 17 and associated pistons 18 actuating the clutch plates 19. The cylinders are to be supplied with activating fluid through the conduits 20, its admission being controlled by the usual selectively operable valves which are responsive to the torque and speed demands placed upon the transmission, but which are not shown in this application.

Clutch A is drivingly connected, through the medium of an overruning clutch 21, to the main transmission shaft 22. The overrunning clutch 21 serves to lock the clutch disc 13 to the shaft 22 to drive the latter, but permits free reverse rotation of the shaft 22. The clutch disc 14 of clutch B is fixed for rotation with the concentric shaft 23, which carries, at its rearward end, the second speed and overdrive gear 24. The main transmission shaft 22 carries—through the medium of an overrunning clutch 25—the reverse, first speed and overdrive pinion 26 and the positive clutch member 27 slidably mounted on the splines 28 and having dogs 29 adapted to engage similar projections 30 on the pinion 26. The clutch is operated by a fork 31 and for convenience in this description is referred to as clutch X. The main transmission shaft 22 terminates in a spider 32 forming one element of a positive clutch mechanism, the clutch member 33 of which is slidably mounted on the splines 34 on the output or driven shaft 35. As before, the member 33 has dogs 36 adapted to engage selectively similar projections 37 on the spider 32 or 38 on the main output gear 39 which is mounted through the medium of an over-running clutch 40 on the driven shaft 35. Forks, indicated at 41, are provided to shift the clutch member 33 into engagement with the spider 32 or the gear 39 or maintain it in a neutral position between the two. Again, for convenience, this entire clutch assembly is referred to hereinafter as clutch Y.

The transmission is provided with the usual countershaft 42, having fixed for rotation therewith, the second speed and overdrive pinion 43 in constant mesh with the gear 24; the reverse, first speed and overdrive gear 44 in constant mesh with the pinion 26; and the main output pinion 45 which is slidably mounted on the splines 46 and which may engage, selectively, the gear 39 or the reverse idler gear 47 which is fixed for rotation with the idler shaft 48. A fork, such as indicated at 49, is provided to make this shift and it is contemplated that the control of this element will be manual, while that of forks 31 and 41 on clutches X and Y will be controlled automatically by torque and/or speed responsive devices of suitable construction. It will be understood that the idler shaft 48 is shown revolved out of position in the drawings and that its axis would normally be as indicated by the dotted line 50, in which position the reverse idler pinion 51 is in constant mesh with the main output gear 39 while the reverse idler gear 47 may be selectively engaged by the pinion 45.

The operation of the transmission may readily be traced out on the drawing through the successive torque ratio engagements as the speed either increases or decreases, thus:

Reverse operation

To effect reverse rotation with maximum torque on the output or driven shaft 35, the pinion 45 is shifted manually longitudinally on the countershaft 42 to engage the idler gear 47 and simultaneously clutch Y is shifted to the right to engage the main output gear 39, thus overriding the overrunning clutch 40 and imparting reverse rotation to the output shaft 35. The control mechanism is so arranged that upon operation of the engine throttle, the clutch A is engaged and the drive from the crankshaft is taken through it and the overrunning clutch 21 to the reverse, first speed and overdrive pinion 26 and gear 44 to the countershaft 42. As noted above, the idler pinion 51 is in constant mesh with the main output gear 39 and the drive is thus transmitted, in reverse sense, through the pinion 45 and idler 47 to it.

First speed operation

In order to obtain first speed forward and maximum torque output, it is again necessary to shift manually the main output pinion 45 to the position shown in the drawing in which it is in engagement with the main output gear 39. Simultaneously, the clutch Y is disengaged from the gear 39 to the position shown in the drawings, so that the forward drive is imparted to the output shaft 35 from the gear 39 through the medium of the overrunning clutch 40. As the engine throttle is opened, the control arrangement is such that the clutch A is again engaged and, as before, the reverse, first speed and overdrive pinion 26 is driven through the overrunning clutch 25 and rotation is imparted to the countershaft 42 through the gear 44 and, in turn, rotates the output shaft 35 through the pinion 45 and the output gear 39, thus giving maximum torque rotation in the forward sense.

Second speed operation

When the transmission is in first speed engagement, to effect the transition to second speed operation, it is only necessary to engage the clutch B through suitable automatic speed and torque responsive controlling means, and the drive then proceeds through the concentric shaft 23, the second and overdrive gear 24 and the pinion 43 to the countershaft 42. This member, in turn, drives through the pinion 45, gear 39, and overrunning clutch 40 to the output shaft 35, imparting forward rotation with intermediate torque conversion. The overrunning clutch 25 permits the free rotation of the pinion 26 which is, of course, rotating faster than the shaft 22. While there is a free-wheeling effect in this speed through the overrunning clutch 40 by engaging the clutch Y manually with the gear 39, the overrunning clutch 40 is locked out so that the vehicle may be braked against compression when operating in mountainous country. This may easily be done for operation in the lower speed ranges by suitable manual overruling controls operating with the automatic means usually operating the clutch Y on the basis of torque and speed condition.

Third speed or direct operation

To obtain the transition from second speed to third speed, the first step contemplates the disengagement of clutch A and the engagement of clutch Y with the spider 32 which may be readily effected as the shaft 22 is rotating freely, thus providing a direct connection between the main transmission shaft 22 and the output shaft 35. Thereafter, the controlling means re-engages clutch A and the drive is taken directly through the overrunning clutch 21 to the main transmission shaft 22 and the output shaft 35, free-wheeling being obtained by reason of the interposition of the overrunning clutch 21. When this operation is completed, clutch B is disengaged and clutch X engages the reverse, first speed and overdrive pinion 26 locking it to the main transmission shaft 22 and then to the output shaft 35 through the clutch Y, preparatory to—

Fourth speed or overdrive operation

Which is effected by then re-engaging clutch B. The drive now proceeds from clutch B to the gear 24, pinion 43, countershaft 42, gear 44, pinion 26, clutch X, main transmission shaft 22, clutch Y and main output shaft 35. There is no free-wheeling forward in the overdrive, although the overrunning clutch 21 permits free rotation of the shaft 22 with respect to the clutch plate 13.

Kick-down from overdrive to direct or third speed operation

In order to return to direct drive from the overdrive, the disengagement of the clutch B alone is required and as clutch A is continuously in engagement at this stage, the direct drive is resumed as outlined above through the clutch A, the overrunning clutch 21, and main transmission shaft 22, and the output shaft 35.

*Shift-down from third speed to second speed operation*

As the torque demand may increase, the higher torque conversion ratio of second speed is obtained by disengaging the clutch X from the reverse, first speed and overdrive pinion 26 and re-engaging clutch B which rotates the pinion 26 through the train afforded by gear 24, pinion 43, countershaft 42 and gear 44 at a speed in excess of that of the transmission shaft 22. Downshift may then be accomplished by disengaging clutch A, permitting the drive through the train comprising gear 24, pinion 43, countershaft 42, pinion 45 and gear 39 to the output shaft 35.

*Shift-down from second to first speed operation*

The cycle of operation back to first speed is completed by first disengaging the clutch Y from the spider 32 on the main transmission shaft 22 and re-engaging clutch A. The shift is then effected by disengaging the clutch B, so that the load is taken by clutch A and transmitted through the overrunning clutch 21 to the main transmission shaft 22 and the overrunning clutch 25 to the reverse, first speed and overdrive pinion 26, the gear 44, the countershaft 42, the pinion 45, the gear 39 and the overrunning clutch 40 to the main output shaft 35.

The principal advantage of the construction is, as it probably already has been noted, that no simultaneously timed shifts of the several clutches are involved in any of the transitions between the several speed ratios, thus, there is no simultaneous disengagement and engagement of different clutches as the speed increases and this is true of the shift from third speed to overdrive, as well. Further, the kick-down from overdrive to third or direct speed is accomplished in the same manner through the interposition of the overrunning clutch 21 in the clutch A. The idea of the structure is that a smoother transition is obtained through each of these steps and that the precise adjustment of the several clutches and their controlling means is not required since the transitions are in effect, overlapping rather than occurring simultaneously. This largely avoids consideration of variation between the operating characteristics of the particular components in use and insures that the transmissions so made may be fabricated from such successive components as production may offer without sacrificing smoothness of operation.

We realize that certain changes may be made in the specific details of construction of this device (which is disclosed, in the main, in schematic form), but it is the intention to cover by the claims all such variations as may reasonably be within the scope thereof.

The invention claimed is:

1. In an automatic transmission for automotive vehicles of the type wherein a plurality of continually meshed change speed gears form automatically selectable different speed ratios, comprising, a driving shaft, a main transmission shaft, a gear rotatably mounted on said main transmission shaft, a countershaft, a second gear mounted on said countershaft and meshing with said first-mentioned gear, a first clutch means interposed between said driving shaft and said main transmission shaft, a second clutch means interposed between said driving shaft and said first-mentioned gear, overrunning clutch means interposed between said first clutch and said transmission shaft, a driven shaft, clutch means to lock said driven shaft to said transmission shaft, a plurality of gears fixed for rotation with said countershaft meshing with co-operating gears on said transmission shaft and driven shaft, overrunning clutch means between said last-named gears and said transmission and driven shafts, and means selectively operable to overrule said last-named clutch means and lock said last-named gears to said transmission and driven shafts.

2. In an automatic transmission for automotive vehicles of the type wherein a plurality of continually meshed change speed gears form automatically selectable different speed ratios, comprising, a driving shaft, a main transmission shaft, a gear rotatably mounted on said main transmission shaft, a countershaft, a second gear mounted on said countershaft and meshing with said first-mentioned gear, a first friction clutch means interposed between said driving shaft and said main transmission shaft, a second friction clutch means interposed between said driving shaft and said first-mentioned gear, overrunning clutch means interposed between said first friction clutch and said transmission shaft, a driven shaft, positive clutch means to lock said driven shaft to said transmission shaft, a plurality of gears fixed for rotation with said countershaft meshing with co-operating gears on said transmission shaft and driven shaft, overrunning clutch means between said last-named gears and said transmission and driven shafts, and means selectively operable to overrule said last-named clutch means and lock said last-named gears to said transmission and driven shafts.

3. In an automatic transmission for automotive vehicles of the type wherein a plurality of continually meshed change speed gears form automatically selectable different speed ratios, comprising, a driving shaft, a main transmission shaft, a gear rotatably mounted on said main transmission shaft, a countershaft, a second gear mounted on said countershaft and meshing with said first-mentioned gear, a first friction clutch means interposed between said driving shaft and said main transmission shaft, a second friction clutch means interposed between said driving shaft and said first-mentioned gear, overrunning clutch means interposed between said first friction clutch and said transmission shaft, a driven shaft, positive clutch means to lock said driven shaft to said transmission shaft, a plurality of gears fixed for rotation with said countershaft meshing with co-operating gears on said transmission shaft and driven shaft, overrunning clutch means between said last-named gears and said transmission and driven shafts, and means selectively operable to overrule said last-named clutch means and positively lock said last-named gears to said transmission and driven shafts, said first and second friction clutch means being selectively operable concurrently or separably.

4. In an automatic transmission for automotive vehicles of the type wherein a plurality of continually meshed change speed gears form automatically selectable different speed ratios, comprising, a driving shaft, a main transmission shaft, a gear rotatably mounted on said main transmission shaft, a countershaft, a second gear mounted on said countershaft and meshing with said first-mentioned gear, a first friction clutch means interposed between said driving shaft and said main transmission shaft, a second friction clutch means interposed between said driving shaft and said first-mentioned gear, overrunning clutch means interposed between said first friction clutch and said main transmission shaft adapted to transmit motion therebetween in but one direction, a driven shaft aligned with said transmission shaft, positive clutch means to lock said driven shaft to said transmission shaft, a plurality of gears fixed for rotation with said countershaft and meshing with co-operating gears on said transmission shaft and driven shaft, said last-named co-operating gears including overrunning clutch means effective with their respective transmission shaft or driven shaft and means selectively operable to overrule said last-named overrunning clutch means and positively lock said co-operating gear to said transmission shaft or driven shaft, said first and second friction clutch means being selectively operable conjointly or separably.

5. In an automatic transmission for automotive vehicles of the type wherein a plurality of continually meshed change speed gears form automatically selectable different speed ratios, comprising, a driving shaft, a main transmission shaft, a gear rotatably mounted on said main transmission shaft, a countershaft, a second gear mounted on said countershaft and meshing with said first-mentioned gear, a first friction clutch means interposed between said driving shaft and said main transmission shaft, a second friction clutch means interposed between said driving shaft and said first-mentioned gear, means interposed between said first friction clutch and said transmission shaft effective to transmit rotation therebetween in but one direction, a driven shaft aligned with said main transmission shaft, positive clutch means effective to lock said driven shaft to said transmission shaft, a plurality of gears fixed for rotation with said countershaft meshing with co-operating gears on said main transmission shaft and driven shaft, said last-named co-operating gears including overrunning clutch means effective with their respective shaft and means selectively operable to overrule said last-named clutch means and positively lock said gears to said main transmission shaft or driven shaft, said first and second friction clutches being selectively operable conjointly or separably, and reversing means selectively engageable with one of said gears fixed for rotation on said countershaft and constantly meshed with said co-operating gear on said driven shaft.

6. In an automatic transmission for automotive vehicles of a type wherein a plurality of constantly meshed change speed gears form automatically selectable different speed ratios, comprising, a driving shaft, a main transmission shaft, a gear rotatably mounted on said main transmission shaft, a driven shaft substantially aligned to said main transmission shaft, a countershaft, a second gear mounted on said countershaft and meshing with said first-mentioned gear, a first selectively operable friction clutch means interposed between said driving shaft and said main transmission shaft, a second selectively operable friction clutch means interposed between said driving shaft and said first-mentioned gear, means interposed between said first friction clutch means and said main transmission shaft effective to transmit rotation between said first friction clutch and said transmission shaft in but one direction, positive clutch means to lock said driven shaft to said transmission shaft, a plurality of gears fixed for rotation with said countershaft meshing with co-operating gears on said transmission shaft and driven shaft, overrunning clutch means between said last-named gears and said transmission and driven shafts, and each including means selectively operable to overrule said last-named overrunning clutch means and positively lock said last-named gears to said transmission and driven shafts, said first and second friction clutch means being operable concurrently or separately.

7. In an automatic transmission for automotive vehicles, comprising, a driving shaft, a main transmission shaft, a driven shaft substantially aligned with said transmission shaft, a countershaft, a sleeve rotatively mounted on said main transmission shaft and carrying gear means driving said countershaft, a first friction clutch means interposed between said driving shaft and an overrunning clutch means on said main transmission shaft, a second friction clutch means interposed between said driving shaft and said sleeve selectively to rotate said countershaft, one speed ratio gear fixed for rotation with said countershaft and in constant mesh with a cooperating gear mounted on said main transmission shaft, a second speed ratio gear fixed for rotation on said countershaft and in constant mesh with a co-operating gear on said driven shaft, overrunning clutch means between the co-operating gear for said first speed ratio and said main transmission shaft, selectively operable positive clutch means effective to lock said last-named co-operating gear to said main transmission shaft for rotation therewith in both directions, a clutch means effective to lock said main transmission shaft to said driven shaft or to fix the co-operating gear of said second speed ratio to said driven shaft or to be disengaged from both said main transmission shaft and said last-named gear, said last-named gear being mounted on said driven shaft by clutch means impelling rotation in but one direction, said first and second clutch means being selectively operable concurrently or separably.

8. The structure of claim 7 which is further characterized in that separate hydraulic operating means are provided for said first and second friction clutch means.

9. The structure of claim 7 which is further characterized in having said second speed ratio gear fixed for rotation on said countershaft axially movable thereon, an idler shaft having a pinion constantly meshed with said co-operating second speed ratio gear on said driven shaft and a gear selectively engageable on axial movements of said second speed ratio gear to impart reserve rotation to said driven shaft.

10. The structure of claim 7 which is further characterized in that an idler shaft carries a pinion constantly in mesh with said co-operating gear of said second speed ratio and an idler gear selectively engageable with said second speed ratio gear fixed for rotation on said countershaft but being axially movable thereon for such selective engagement.

11. In a transmission for automotive vehicles of the type wherein a plurality of continually meshed changing gears form automatically selectable different speed ratios, comprising, a driving shaft, a clutch housing carried on said driving shaft, a main transmission shaft substantially aligned with said driving shaft, a driven shaft substantially aligned with said main transmission shaft, a countershaft, a first friction clutch means in said clutch housing and including a clutch disc, an overrunning clutch means interposed between said clutch disc and said main transmission shaft effective to transmit rotation therebetween in but one direction, a second friction clutch means in said clutch housing including a clutch plate secured to a sleeve rotatably mounted on said main transmission shaft, a gear fixed to rotate with said sleeve, a gear fixed to rotate with said countershaft meshing with said last-named gear, a first ratio speed gear fixed for rotation with said countershaft and constantly meshing with a co-operating gear mounted on said main transmission shaft through the interposition of an overrunning clutch, positive clutching means effective on said main transmission shaft to lock said co-operating gear to said shaft for rotation in both directions, said main transmission shaft terminating rearwardly in a spider, a final drive pinion fixed for rotation with said countershaft rearwardly of said spider, a main output gear constantly meshed with said output pinion and carried on said driven shaft through the medium of an overrunning clutch effective to transmit rotation therebetween in but one direction, said driven shaft extending forwardly of said main output gear to adjacent said spider and carrying thereon a selectively operable clutch means, said last-named clutch means being adapted in one extreme position to engage said spider on said main transmission shaft and lock said main transmission shaft to said driven shaft and in the other extreme position to lock said main output gear to said driven shaft overruling said overrunning clutch therebetween and in the mean position to be disengaged from said spider and said main output gear, said first and second friction clutch means being operated concurrently or separately, and reversing means selectively engageable by said final drive pinion and constantly in mesh with said main output gear to impart reverse rotation to said driven shaft.

ROBERT F. KOHR.

REFERENCES CITED

The following references are of record in the file of this patent:

UNITED STATES PATENTS

| Number | Name | Date |
|---|---|---|
| 2,193,267 | Burtnett | Mar. 12, 1940 |
| 2,205,832 | Henriod | June 25, 1940 |
| 2,218,530 | Hall et al. | Oct. 22, 1940 |
| 2,344,656 | Swennes | Mar. 21, 1944 |
| 2,376,545 | Livermore | May 22, 1945 |
| 2,386,540 | Campodonico | Oct. 9, 1945 |